Jan. 3, 1933.  LE ROY C. SCHENCK  1,893,038
OSCILLATION LIMIT DEVICE
Filed Dec. 10, 1929  2 Sheets-Sheet 1

INVENTOR:
LEROY C. SCHENCK
BY
ATTORNEY

Jan. 3, 1933.  LE ROY C. SCHENCK  1,893,038
OSCILLATION LIMIT DEVICE
Filed Dec. 10, 1929    2 Sheets-Sheet 2
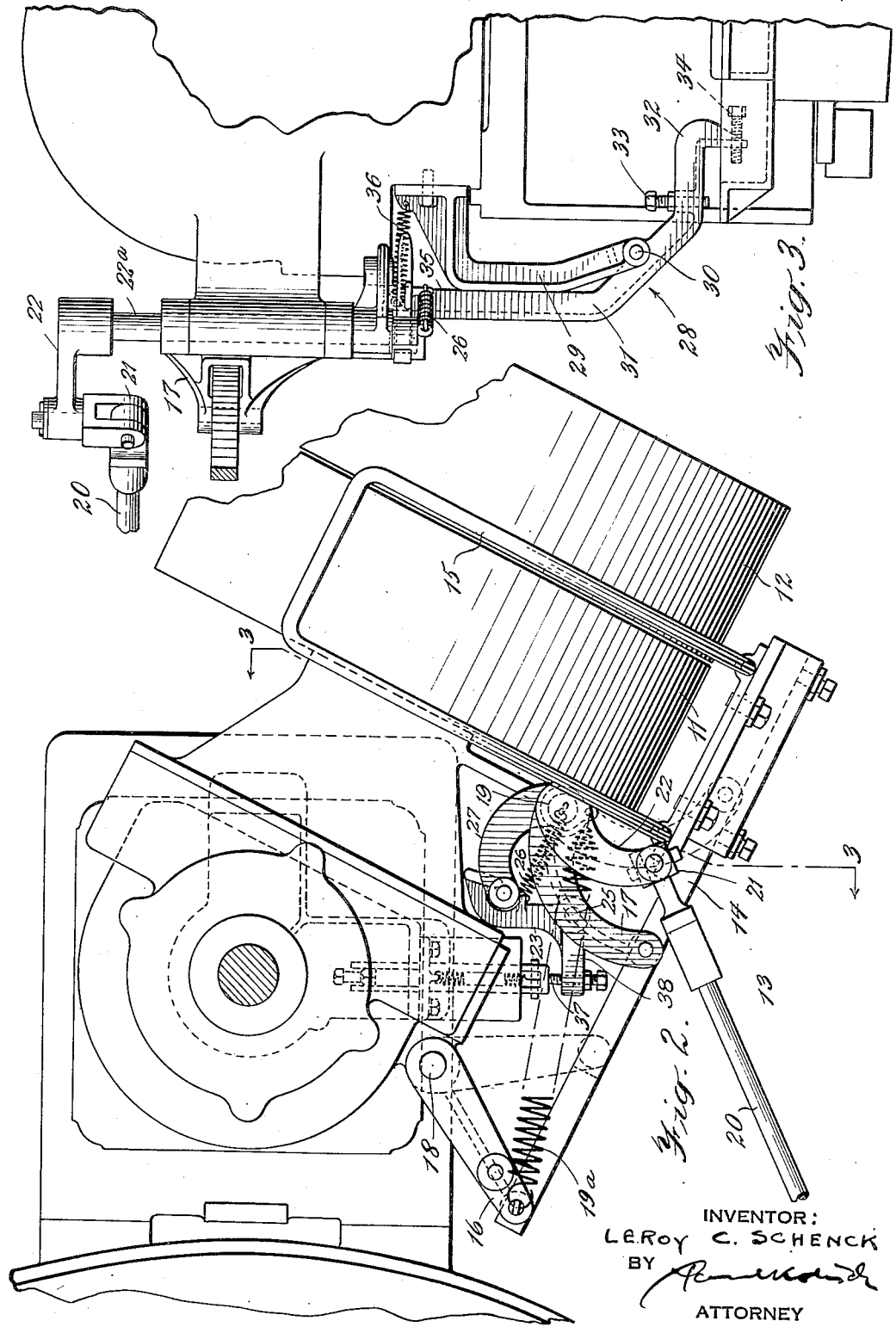
INVENTOR:
LE ROY C. SCHENCK
BY
ATTORNEY Patented Jan. 3, 1933

1,893,038

UNITED STATES PATENT OFFICE

LE ROY C. SCHENCK, OF MOLINE, ILLINOIS, ASSIGNOR TO TROY LAUNDRY MACHINERY COMPANY, INC., OF NEW YORK, N. Y., A CORPORATION OF DELAWARE

OSCILLATION LIMIT DEVICE

Application filed December 10, 1929. Serial No. 412,983.

This invention relates to centrifugal machinery, such as centrifugal extractors used in the laundry field.

An object of the invention is the provision of control means for a centrifugal extractor, responsive to a predetermined degree of vibration or oscillation thereof, for disconnecting the extractor from its driving means.

In accordance with my invention I provide an extractor of the type having a freely movable basket, with means responsive to a predetermined degree of horizontal or vertical motion thereof, for disconnecting the basket from its driving means. This may be done, for example, where the driving means comprises a shaft carrying the usual tight driving pulley, loose idler pulley and associated shiftable belt, by providing a mechanism actuated by a certain predetermined movement of the basket, to shift the belt from the tight to the loose pulley. The same mechanism might obviously be used to operate any mechanical clutch mechanism of conventional type.

The above mentioned and further objects and advantages and the manner of attaining them will be made clear in the following description and accompanying drawings.

In the drawings, Fig. 1 illustrates in side elevation a centrifugal extractor embodying my invention;

Fig. 2 is a plan view of a portion of the mechanism continued in Fig. 1; and

Fig. 3 is a fragmental side elevation taken along line 3—3 of Fig. 2.

Figure 1:
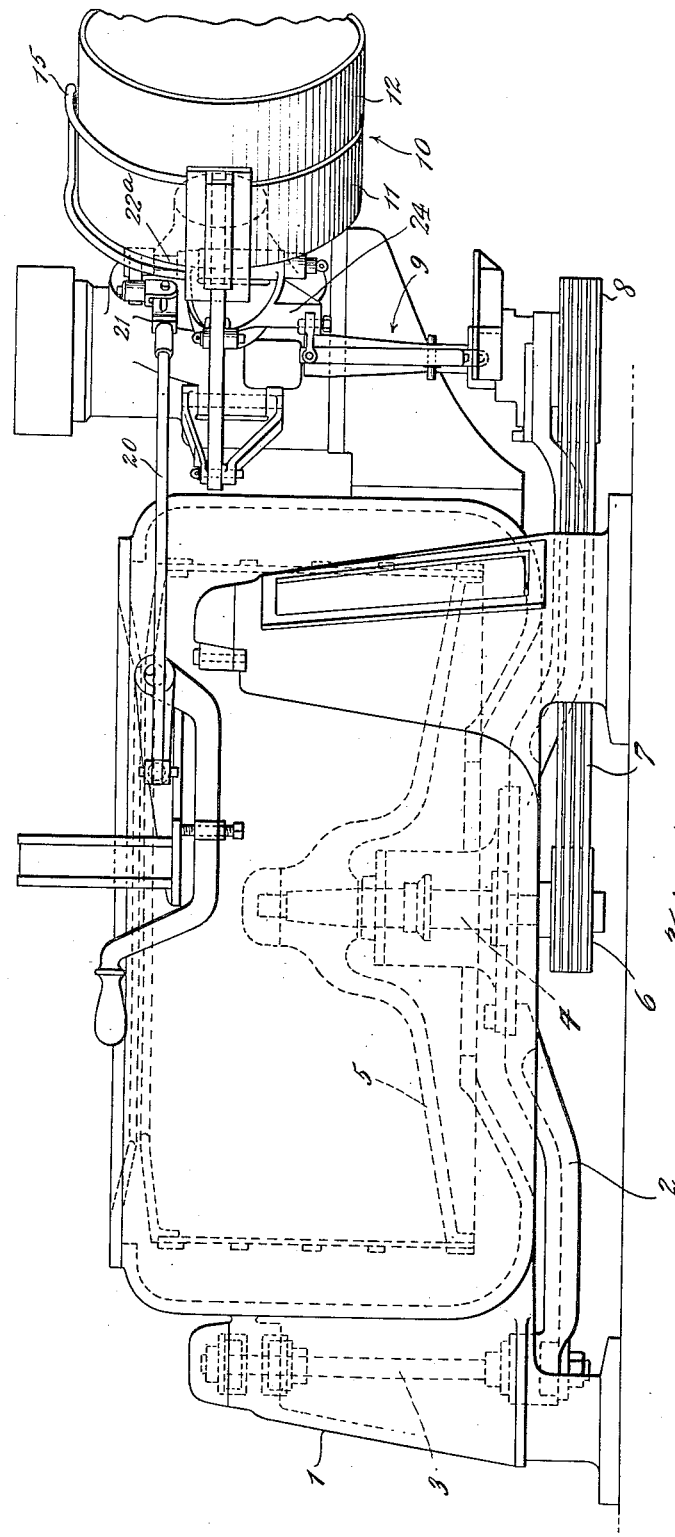

Referring more particularly to the drawings, reference numeral 1 indicates an extractor curb or housing from which is suspended a bearing plate 2 by means of links 3. Bearing plate 2 has rotatably mounted thereon a spindle 4 carrying a rotatable basket 5. The lower end of the spindle is provided with a grooved pulley 6 carrying a plurality of belts 7 which travel on a driving pulley supported by a shaft 8 journaled in an extension of the bearing plate 2. The shaft 8 is connected through suitable universal joints and driving shaft mechanism, indicated generally by 9, with a pair of pulleys 10. One of these pulleys 11 is a tight, or driving pulley, and the other, 12, is a loose, or idler pulley. A power driven belt cooperates with these pulleys and serves to run the extractor. This belt is moved onto the tight pulley for driving the extractor, and onto the loose pulley when it is desired to stop the extractor, in the conventional manner. For shifting the belt from one pulley to the other a belt shifting mechanism 13 is utilized. This comprises a bar 14 carrying a pair of shifting fingers 15 firmly fixed thereto, which serve to move the belt sidewise from one pulley to the other. The bar 14 is carried by two arms 16 and 17 which are pivotally mounted at 18 and 19. The bar is normally urged to a right-hand position, as viewed in Fig. 2, by means of a spring 19$^a$, which corresponds to an idling position of the driving belt. For moving the bar in a left-hand direction to transfer the driving belt to the tight pulley a pull rod mechanism 20 is furnished. This rod connects, by means of a swivel joint 21, with an arm 22 pinned to the shaft 22$^a$. The arm 17 is freely mounted on the shaft 22$^a$ so in order for the rod 20 to be made effective, further coupling means is necessary. This coupling means comprises a latch 23 pivotally connected at 25 to an extension 24 of the arm 17. This latch is urged in a clockwise direction by a spring 26 into engagement with a finger 27 pinned to the lower end of the shaft 22$^a$. By virtue of latch 23 and the finger 27, which are normally held firmly in engagement by the spring 26, the pull rod 20 is maintained in operative connection with the arm 17. If the rod 20 is moved longitudinally, the arm 22 rotates the shaft 22$^a$ which carries with it finger 27. The finger being firmly engaged in the latch 23, draws the latch along with it, thereby swinging the arm 17 on which the latch is mounted.

When the basket 5 is loaded with laundry unevenly so that it is out of balance, either horizontally or vertically, and the machine is started into operation, the unbalance causes vibration or oscillation of the basket, which is permitted by the suspension links 3. In order to cut off the power supplied to the extractor basket in case the oscillation thereof exceeds certain limits, an oscillation limiting device 28 is provided. This device comprises a stationary bracket 29 carried by the curb 1 of the machine, which has pivotally mounted thereon at 30 a lever 31. This lever has at its lower end a right angle bent portion 32 which carries a pair of set screws 33 and 34. This angularly bent portion is placed adjacent to a portion of the bearing plate 2 so that upon a certain predetermined motion of the bearing plate either or both of the set screws 33, 34 are struck, thereby tilting the lever 31 in a counter-clockwise direction, as viewed in Fig. 3. By means of the set screws 33, 34 it is possible to determine in advance how much oscillation of the basket will be necessary to rotate the lever. When the lever is struck and moved sufficiently by the bearing plate 2, the upper end thereof 35, which is normally held in a fixed position by a spring 36, is moved against a set screw 37 carried by a tail 38 of the latch 23, thereby moving the latch in a counter-clockwise direction and tending to disengage it from the fingers 27. When this movement is sufficiently great the latch is freed entirely from the fingers, thereby breaking the connection between the operating pull rod 20 and the arm 17, permitting the spring 19 to move the shifting fingers 15 so that the driving belt rides the idler pulley 12. This movement prevents power from being supplied to the basket and allows it to stop rotating. When this occurs the operator of the extractor has to rearrange the load in the basket so that a less degree of vibration or oscillation will occur. After this has been done the pull rod 20, which during the operation of the machine is maintained locked in an operative position by a mechanism not shown, is moved right-handedly, as viewed in Fig. 1, to the normally inoperative position. This movement causes the latch 23 to reengage with the fingers 27 and again lock the operating rod 20 to the arm 17, so that when the rod is moved to its normal operating position, the belt shifter 13 will also be moved to an operative position carrying the driving belt into engagement with the tight pulley 11.

By virtue of the adjustable screws 33, 34 and 37, it is possible accurately to adjust the oscillation-limiting mechanism to act with any predetermined degree of oscillation desired. Because of the fact that the lever 31 is provided with the right-angularly bent portion 32, the device is responsive to either horizontal or vertical oscillation of the basket.

I have disclosed a particular embodiment of my invention for the purposes of illustration, but it will be understood that various modifications and adaptations may be made within the spirit of the invention, as set forth in the appended claims.

What is claimed is:

1. In a centrifugal extractor, a basket rotatably mounted on an oscillatory support, a shaft for driving said basket, a driving pulley and an idler pulley on said shaft, a driving belt for said pulleys, a belt shifter therefor, a spring adapted to move said shifter from operative to inoperative position, means responsive to a predetermined degree of oscillation of said support for releasing said belt shifter to permit movement of said shifter by said spring, manual means for returning said shifter to operative position, and means connected with said manual means for co-action with said releasing means to render said manual means effective.

2. In a centrifugal extractor, a basket rotatably mounted on an oscillatory support, a shaft for driving said basket, a driving pulley and an idler pulley on said shaft, a driving belt for said pulleys, a belt shifter therefor, a spring adapted to move said shifter from operative to inoperative position, means responsive to a predetermined degree of oscillation of said support for releasing said belt shifter to permit movement of said shifter by said spring, a pull rod for manually returning said shifter to operative position, and means connected with said pull rod for co-action with said releasing means to render said pull rod effective.

3. In a centrifugal extractor, a basket rotatably mounted on an oscillatory support, a shaft for driving said basket, a driving pulley and an idler pulley on said shaft, a driving belt for said pulleys, a belt shifter therefor, a spring adapted to move said shifter from operative to inoperative position, means responsive to a predetermined degree of oscillation of said support for releasing said belt shifter to permit movement of said shifter by said spring, and means co-acting with said releasing means for returning said shifter to operative position.

4. In a centrifugal extractor, a basket rotatably mounted on an oscillatory support, a shaft for driving said basket, a driving pulley and an idler pulley on said shaft, a driving belt for said pulleys, a belt shifter having a range of movement greater than the permissible range of movement of the basket, and means made effective upon said permissible range of movement of said basket being achieved for giving said belt shifter the necessary greater range of movement to move the belt from the tight to the loose pulley.

5. In a centrifugal extractor, a basket rotatably mounted on an oscillatory support, a shaft for driving said basket, a driving pulley and an idler pulley on said shaft, a driving belt for said pulleys, belt-shifting means therefor, spring means for maintaining said shifter in such position as to keep the belt on the idler pulley, a rockable shaft having an arm journalled thereon for operating said shifter, a latch carried by said arm, a finger keyed to said rockable shaft, spring means for maintaining said latch and finger in locking engagement, manual means for rocking said shaft, and means responsive to a predetermined degree of oscillation of said oscillatory support for unlocking said latch and finger.

6. In a centrifugal extractor, in combination, a basket rotatably mounted on an oscillatory support, a shaft for driving said basket, shifter means for connecting said shaft with a source of power and for disconnecting it therefrom, a spring for moving said shifter to the disconnected position, means normally in cooperative engagement with said shifter and manually movable in one direction to carry said shifter to operative position and manually movable in another direction to permit actuation of said shifter by said spring, and means responsive to a predetermined degree of oscillation of said support for releasing said shifter from cooperative engagement with said manually movable means to permit operation of said shifter by said spring.

In testimony whereof, I have signed my name to this specification, this 5th day of December, 1929.

LE ROY C. SCHENCK.